(12) United States Patent
Kopatsy

(10) Patent No.: US 10,015,249 B2
(45) Date of Patent: Jul. 3, 2018

(54) NAMESPACE TRANSLATION

(71) Applicant: Dropbox, Inc., San Francisco, CA (US)

(72) Inventor: Arthur Kopatsy, San Francisco, CA (US)

(73) Assignee: DROPBOX, INC., San Francisco, CA (US)

( * ) Notice: Subject to any disclaimer, the term of this patent is extended or adjusted under 35 U.S.C. 154(b) by 288 days.

(21) Appl. No.: 14/932,704

(22) Filed: Nov. 4, 2015

(65) Prior Publication Data

US 2017/0126799 A1 May 4, 2017

(51) Int. Cl.
| | |
|---|---|
| G06F 15/173 | (2006.01) |
| H04L 29/08 | (2006.01) |
| H04L 12/741 | (2013.01) |
| H04L 29/12 | (2006.01) |
| G06F 17/30 | (2006.01) |

(52) U.S. Cl.
CPC .... *H04L 67/1095* (2013.01); *G06F 17/30123* (2013.01); *H04L 45/74* (2013.01); *H04L 61/25* (2013.01)

(58) Field of Classification Search
None
See application file for complete search history.

(56) References Cited

U.S. PATENT DOCUMENTS

| | | | |
|---|---|---|---|
| 6,678,724 B2 | 1/2004 | Nakajima et al. | |
| 8,825,597 B1 | 9/2014 | Houston et al. | |
| 8,874,907 B1* | 10/2014 | Christensen | H04L 67/1097 713/165 |
| 2003/0196052 A1* | 10/2003 | Bolik | G06F 11/1448 711/162 |
| 2007/0038697 A1 | 2/2007 | Zimran et al. | |
| 2007/0088702 A1 | 4/2007 | Fridella et al. | |
| 2009/0292957 A1* | 11/2009 | Bower | G06F 11/0727 714/55 |
| 2012/0036107 A1* | 2/2012 | Miloushev | G06F 11/1076 707/652 |
| 2014/0006465 A1 | 1/2014 | Davis et al. | |
| 2014/0317115 A1* | 10/2014 | Pauly | G06F 17/30297 707/737 |
| 2015/0293938 A1* | 10/2015 | Hittle | G06F 17/30082 707/831 |
| 2017/0075921 A1* | 3/2017 | Benton | G06F 17/30174 |

* cited by examiner

*Primary Examiner* — Joshua Joo

(57) ABSTRACT

An example computer-implemented method to translate a namespace includes receiving a first synchronization request associated with a first content item. This first synchronization request can include a first content item path and come from a client device. The example method can then include determining that a portion of the first content item path matches an entry path in an entry in a namespace mount table. The entry can include a second namespace. The example method can then include modifying the first synchronization request by removing the portion of the first content item path and including the second namespace in the first synchronization request. The example method can then include sending the first synchronization request to a content management system.

20 Claims, 10 Drawing Sheets

300a

| | Mounted Namespace | | Client Path |
|---|---|---|---|
| 302a | namespace2: | <=> | namespace1:Share/ |
| 302b | namespace1: | <=> | namespace1: |

| | Mounted Namespace | | Client Path |
|---|---|---|---|
| 302c | namespace2: | <=> | root://Cloud/Share/ |
| 302d | namespace1: | <=> | root://Cloud/ |

| | Mounted Namespace | | Client Path |
|---|---|---|---|
| 302e | namespace2: | <=> | namespace3:Pics/Vacay/ |
| 302f | namespace3: | <=> | namespace3: |

| | Mounted Namespace | | Client Path |
|---|---|---|---|
| 302g | namespace4: | <=> | namespace10:A/B/E/ |
| 302h | namespace5: | <=> | namespace10:A/B/C/D/ |
| 302i | namespace6: | <=> | namespace10:A/B/C/ |
| 302j | namespace7: | <=> | namespace10:A/B/ |
| 302k | namespace8: | <=> | namespace10:A/ |
| 302l | namespace9: | <=> | namespace10: |

FIG. 3D

Client Synchronization Program Mount Table 310

| | Mounted Namespace | | Local Path |
|---|---|---|---|
| 312 | namespace1: | <=> | C:/Cloud/ |
| 313 | namespace2: | <=> | C:/Cloud/Share/ |

FIG. 3E

| Path Reported by Operating System | Path Reported by Client Synchronization Program | Path Reported by Content Management System |
|---|---|---|
| 330 C:/Temp/ | N/A | N/A |
| 332 C:/Cloud/Work/file | namespace1: Work/file | namespace1: Work/file |
| 334 C:/Cloud/Share/pic | namespace1: Share/pic | namespace2: pic |

FIG. 3F

NAMESPACE TRANSLATION

BACKGROUND

Some content management systems facilitate sharing content items and collections amongst users through the use of distinct namespaces. In current approaches, software running on a client device identifies shared collections contained within a synchronized collection. The shared collections are then synchronized with their respective namespaces while the remainder of the synchronized collection is synchronized with another namespace. In current approaches, the software running on the client device actively manages the assignments between collections and namespaces. However, managing multiple namespaces within a client software environment introduces development and processing complexity. Namespace management within the client software environment can also introduce correctness issues and violate the principle of only having a "single source of truth." What is needed is an approach that more intelligently manages namespaces.

SUMMARY

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Disclosed are systems, methods, and non-transitory computer-readable storage media for translating namespaces between devices.

An example computer-implemented method to translate a namespace includes receiving a first synchronization request associated with a first content item. This first synchronization request can include a first content item path and come from a client device. The example method can then include determining that a portion of the first content item path matches an entry path in an entry in a namespace mount table. The entry can include a second namespace. The example method can then include modifying the first synchronization request by removing the portion of the first content item path and including the second namespace in the first synchronization request. The example method can then include sending the first synchronization request to a content management system.

BRIEF DESCRIPTION OF THE DRAWINGS

The above-recited and other advantages and features of the disclosure will become apparent by reference to specific embodiments thereof which are illustrated in the appended drawings. Understanding that these drawings depict only example embodiments of the disclosure and are not therefore to be considered to be limiting of its scope, the principles herein are described and explained with additional specificity and detail through the use of the accompanying drawings in which:

FIGS. 3A-3F show example namespace mount tables with FIG. 3F showing a comparison of paths reported by various entities;

DETAILED DESCRIPTION

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

The disclosed technology addresses the need in the art for translating a synchronization request between namespaces. Many content management systems facilitate sharing content items and collections amongst users through the use of distinct namespaces. In current approaches, software running on a client device identifies shared collections contained within a synchronized collection. The shared collections are then synchronized with their respective namespaces while the remainder of the synchronized collection is synchronized with another namespace. In current approaches, the software running on the client device actively manages the assignments between collections and namespaces. However, managing multiple namespaces within a client software environment introduces development and processing complexity. Namespace management within the client software environment can also introduce correctness issues and violate the principle of only having a "single source of truth." A solution to this problem can include creating a namespace translator and simplifying synchronization logic on the client devices and content management system. For example, the client device can deal with only one namespace (or not use namespaces entirely) and the namespace translator can translate synchronization requests to the appropriate namespace for the content management system.

Figure 1:
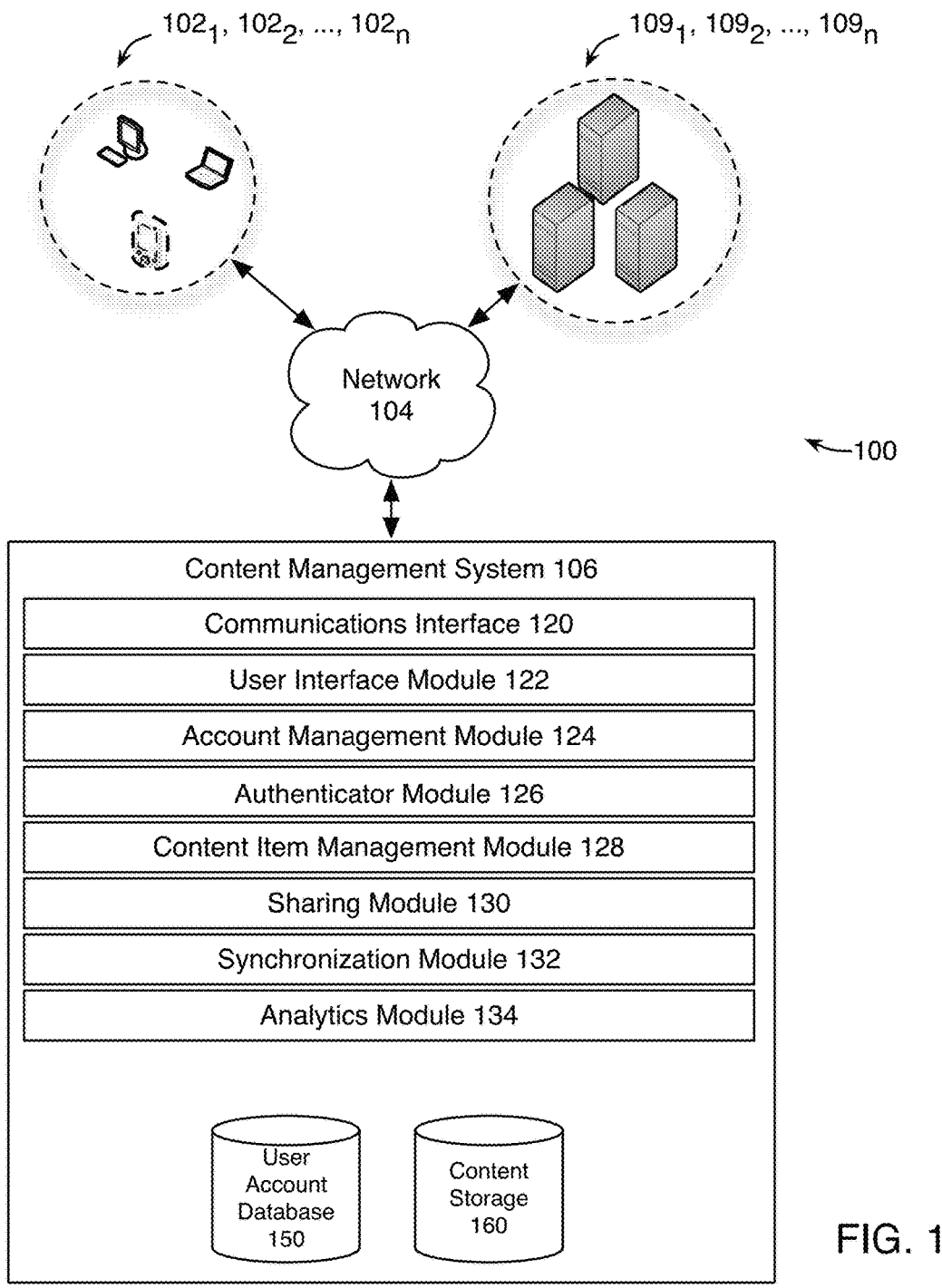
FIG. 1 shows an example configuration of devices and a network in accordance with some embodiments.

With respect to implementing various embodiments of the disclosed technology, an example system configuration 100 is shown in FIG. 1, wherein electronic devices communicate via a network for purposes of exchanging content and other data. The system can be configured for use on a wide area network such as that illustrated in FIG. 1. However, the present principles are applicable to a wide variety of network configurations that facilitate the intercommunication of electronic devices. For example, each of the components of system 100 in FIG. 1 can be implemented in a localized or distributed fashion in a network.

In system 100, a user can interact with content management system 106 (e.g., an online synchronized content management system) through client devices $102_1, 102_2, \ldots, 102_n$ (collectively "102") connected to network 104 by direct and/or indirect communication. Content management system 106 can support connections from a variety of different client devices, such as: desktop computers; mobile computers; mobile communications devices, e.g. mobile phones, smart phones, tablets; smart televisions; set-top boxes; and/or any other network enabled computing devices. Client devices 102 can be of varying type, capabilities, operating systems, etc. Furthermore, content management system 106 can concurrently accept connections from and interact with multiple client devices 102.

A user can interact with content management system 106 via a client-side application installed on client device $102_i$. In some embodiments, the client-side application can include a content management system specific component. For example, the component can be a stand-alone application, one or more application plug-ins, and/or a browser extension. However, the user can also interact with content management system 106 via a third-party application, such as a web browser, that resides on client device $102_i$ and is configured to communicate with content management system 106. In either case, the client-side application can present a user interface (UI) for the user to interact with content management system 106. For example, the user can interact with the content management system 106 via a client-side application integrated with the file system or via a webpage displayed using a web browser application.

Content management system 106 can enable a user to store content, as well as perform a variety of content management tasks, such as retrieve, modify, browse, and/or share the content. Furthermore, content management system 106 can enable a user to access the content from multiple client devices 102. For example, client device $102_i$ can upload content to content management system 106 via network 104. Later, the same client device $102_i$ or some other client device $102_j$ can retrieve the content from content management system 106.

To facilitate the various content management services, a user can create an account with content management system 106. User account database 150 can maintain the account information. User account database 150 can store profile information for registered users. In some cases, the only personal information in the user profile can be a username and/or email address. However, content management system 106 can also be configured to accept additional user information such as birthday, address, billing information, etc.

User account database 150 can include account management information, such as account type (e.g. free or paid), usage information, (e.g. file edit history), maximum storage space authorized, storage space used, content storage locations, security settings, personal configuration settings, content sharing data, etc. Account management module 124 can be configured to update and/or obtain user account details in user account database 150. The account management module 124 can be configured to interact with any number of other modules in content management system 106.

An account can be used to store content, such as digital data, documents, text files, audio files, video files, etc., from one or more client devices 102 authorized on the account. The content can also include collections for grouping content items together with different behaviors, such as folders, playlists, albums, etc. For example, an account can include a public folder that is accessible to any user. The public folder can be assigned a web-accessible address. A link to the web-accessible address can be used to access the contents of the public folder. In another example, an account can include: a photos collection that is intended for photos and that provides specific attributes and actions tailored for photos; an audio collection that provides the ability to play back audio files and perform other audio related actions; or other special purpose collection. An account can also include shared collections or group collections that are linked with and available to multiple user accounts. The permissions for multiple users may be different for a shared collection.

The content can be stored in content storage 160. Content storage 160 can be a storage device, multiple storage devices, or a server. Alternatively, content storage 160 can be a cloud storage provider or network storage accessible via one or more communications networks. Content management system 106 can hide the complexity and details from client devices 102 so that client devices 102 do not need to know exactly where or how the content items are being stored by content management system 106. In some embodiments, content management system 106 can store the content items in the same collection hierarchy as they appear on client device $102_i$. However, content management system 106 can store the content items in its own order, arrangement, or hierarchy. Content management system 106 can store the content items in a network accessible storage (NAS) device, in a redundant array of independent disks (RAID), etc. Content storage 160 can store content items using one or more partition types, such as FAT, FAT32, NTFS, EXT2, EXT3, EXT4, HFS/HFS+, BTRFS, and so forth.

Content storage 160 can also store metadata describing content items, content item types, and the relationship of content items to various accounts, collections, or groups. The metadata for a content item can be stored as part of the content item or can be stored separately. In one variation, each content item stored in content storage 160 can be assigned a system-wide unique identifier.

Content storage 160 can decrease the amount of storage space required by identifying duplicate content items or duplicate segments of content items. Instead of storing multiple copies, content storage 160 can store a single copy and then use a pointer or other mechanism to link the duplicates to the single copy. Similarly, content storage 160 can store content items more efficiently, as well as provide the ability to undo operations, by using a content item version control that tracks changes to content items, different versions of content items (including diverging version trees), and a change history. The change history can include a set of changes that, when applied to the original content item version, produce the changed content item version.

Content management system 106 can be configured to support automatic synchronization of content from one or more client devices 102. The synchronization can be platform agnostic. That is, the content can be synchronized across multiple client devices 102 of varying type, capabilities, operating systems, etc. For example, client device $102_i$ can include client software, which synchronizes, via a synchronization module 132 at content management system 106, content in client device $102_i$'s file system with the content in an associated user account. In some cases, the client software can synchronize any changes to content in a designated collection and its sub-collections, such as new, deleted, modified, copied, or moved content items or collections. The client software can be a separate software application, can integrate with an existing content management application in the operating system, or some combination thereof. In one example of client software that integrates with an existing content management application, a user can manipulate content items directly in a local collection, while a background process monitors the local collection for changes and synchronizes those changes to content management system 106. Conversely, the background process can identify content that has been updated at content management system 106 and synchronize those changes to the local collection. The client software can provide notifications of synchronization operations, and can provide indications of content statuses directly within the content management application. Sometimes client device 102$_i$ may not have a network connection available. In this scenario, the client software can monitor the linked collection for content item changes and queue those changes for later synchronization to content management system 106 when a network connection is available. Similarly, a user can manually start, stop, pause, or resume synchronization with content management system 106.

A user can view or manipulate content via a web interface generated and served by user interface module 122. For example, the user can navigate in a web browser to a web address provided by content management system 106. Changes or updates to content in the content storage 160 made through the web interface, such as uploading a new version of a content item, can be propagated back to other client devices 102 associated with the user's account. For example, multiple client devices 102, each with their own client software, can be associated with a single account and content items in the account can be synchronized between each of the multiple client devices 102.

Content management system 106 can include a communications interface 120 for interfacing with various client devices 102, and can interact with other content and/or service providers 109$_1$, 109$_2$, . . . , 109$_n$ (collectively "109") via an Application Program Interface (API). Certain software applications can access content storage 160 via an API on behalf of a user. For example, a software package, such as an app running on a smartphone or tablet computing device, can programmatically make calls directly to content management system 106, when a user provides credentials, to read, write, create, delete, share, or otherwise manipulate content. Similarly, the API can allow users to access all or part of content storage 160 through a web site.

Content management system 106 can also include authenticator module 126, which can verify user credentials, security tokens, API calls, specific client devices, and so forth, to ensure only authorized clients and users can access content items. Further, content management system 106 can include analytics module 134 that can track and report on aggregate file operations, user actions, network usage, total storage space used, as well as other technology, usage, or business metrics. A privacy and/or security policy can prevent unauthorized access to user data stored with content management system 106.

Content management system 106 can include sharing module 130 for managing sharing content publicly or privately. Sharing content publicly can include making the content item accessible from any computing device in network communication with content management system 106. Sharing content privately can include linking a content item in content storage 160 with two or more user accounts so that each user account has access to the content item. The sharing can be performed in a platform agnostic manner. That is, the content can be shared across multiple client devices 102 of varying type, capabilities, operating systems, etc. The content can also be shared across varying types of user accounts.

In some embodiments, content management system 106 can be configured to maintain a content directory identifying the location of each content item in content storage 160. The content directory can include a unique content entry for each content item stored in the content storage.

A content entry can include a content path that can be used to identify the location of the content item in a content management system. For example, the content path can include the name of the content item and a folder hierarchy associated with the content item. For example, the content path can include a folder or path of folders in which the content item is placed as well as the name of the content item. Content management system 106 can use the content path to present the content items in the appropriate folder hierarchy.

A content entry can also include a content pointer that identifies the location of the content item in content storage 160. For example, the content pointer can include the exact storage address of the content item in memory. In some embodiments, the content pointer can point to multiple locations, each of which contains a portion of the content item.

In addition to a content path and content pointer, a content entry can also include a user account identifier that identifies the user account that has access to the content item. In some embodiments, multiple user account identifiers can be associated with a single content entry indicating that the content item has shared access by the multiple user accounts.

To share a content item privately, sharing module 130 can be configured to add a user account identifier to the content entry associated with the content item, thus granting the added user account access to the content item. Sharing module 130 can also be configured to remove user account identifiers from a content entry to restrict a user account's access to the content item.

To share content publicly, sharing module 130 can be configured to generate a custom network address, such as a uniform resource locator (URL), which allows any web browser to access the content in content management system 106 without any authentication. To accomplish this, sharing module 130 can be configured to include content identification data in the generated URL, which can later be used to properly identify and return the requested content item. For example, sharing module 130 can be configured to include the user account identifier and the content path in the generated URL. Upon selection of the URL, the content identification data included in the URL can be transmitted to content management system 106 which can use the received content identification data to identify the appropriate content entry and return the content item associated with the content entry.

In addition to generating the URL, sharing module 130 can also be configured to record that a URL to the content item has been created. In some embodiments, the content entry associated with a content item can include a URL flag indicating whether a URL to the content item has been created. For example, the URL flag can be a Boolean value initially set to 0 or false to indicate that a URL to the content item has not been created. Sharing module 130 can be configured to change the value of the flag to 1 or true after generating a URL to the content item.

In some embodiments, sharing module 130 can also be configured to deactivate a generated URL. For example, each content entry can also include a URL active flag indicating whether the content should be returned in response to a request from the generated URL. For example, sharing module 130 can be configured to only return a content item requested by a generated link if the URL active flag is set to 1 or true. Thus, access to a content item for which a URL has been generated can be easily restricted by changing the value of the URL active flag. This allows a user to restrict access to the shared content item without having to move the content item or delete the generated URL. Likewise, sharing module 130 can reactivate the URL by again changing the value of the URL active flag to 1 or true. A user can thus easily restore access to the content item without the need to generate a new URL.

While content management system 106 is presented with specific components, it should be understood by one skilled in the art, that the architectural configuration of system 106 is simply one possible configuration and that other configurations with more or fewer components are possible.

Figure 2:
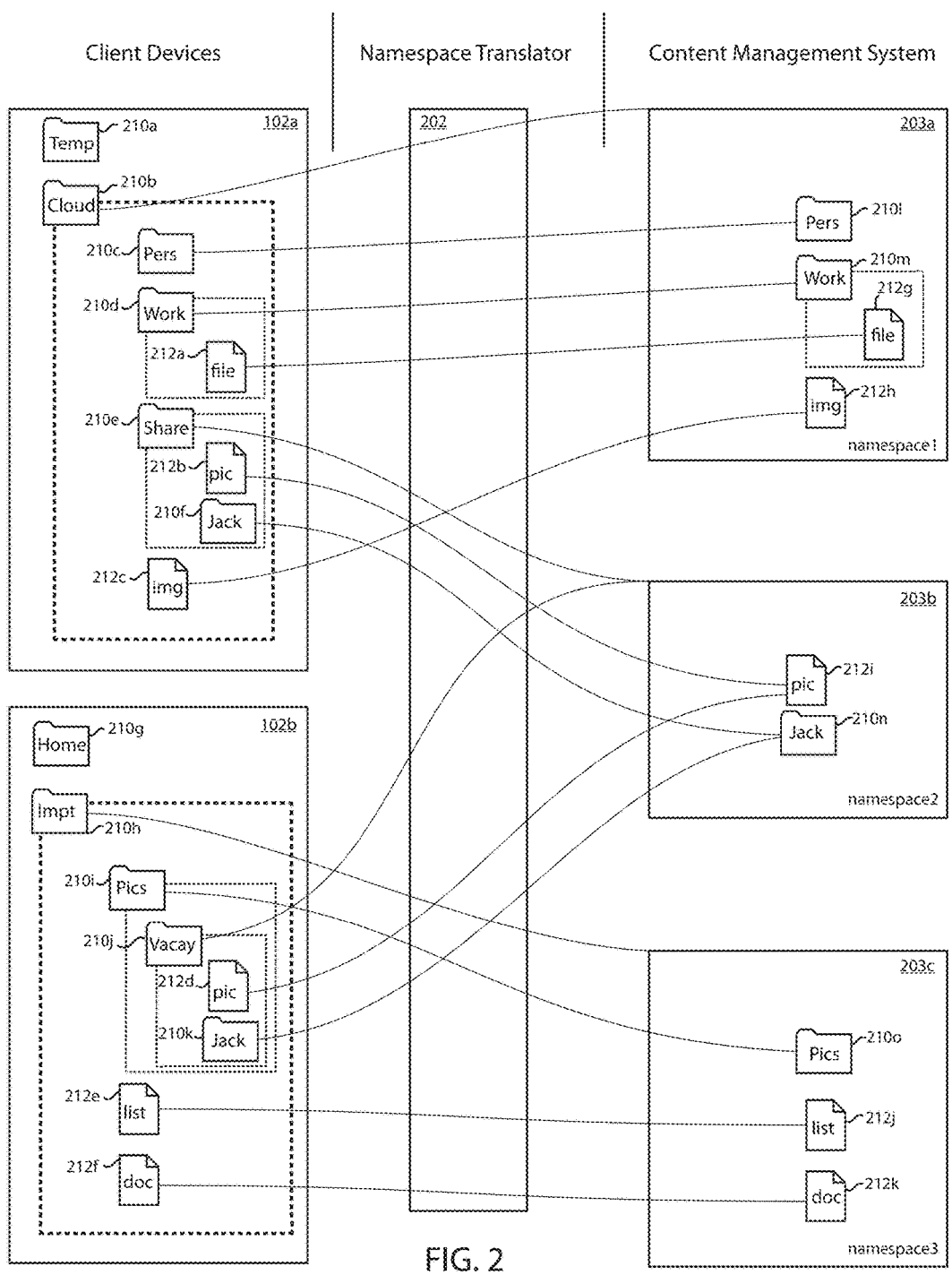
FIG. 2 shows an example mapping between collections on client devices and namespaces on a content management system.

FIG. 2 shows the synchronization of various collections $210_a$-$210_o$ and content items $212_a$-$212_k$ between client devices $102_a$-$102_b$ and namespaces $203_a$-$203_o$ residing on content management system 106 using namespace translator 202. A collection can contain another collection (e.g., "child collection") as well as content item 212 (e.g., "child content item"). For example, collection $210_b$ contains collections $210_c$, $210_d$, and $210_e$, as well as content item $212_c$. FIG. 2 represents collection $210_b$ synchronized with namespace $203_a$, collections $210_e$ and $210_j$ synchronized with namespace $203_b$, and collection $210_h$ synchronized with namespace $203_c$. When a collection (e.g., collection $210_b$) is synchronized with a namespace (e.g., namespace $203_a$), child collections (e.g., collections $210_c$ and $210_d$) and child content items (e.g., content item $212_a$) can be synchronized as well. For example, content item $212_a$ can be synchronized with content item $212_g$.

In some embodiments, a child collection is synchronized with another namespace, distinct from its parent collection. For example, collection $210_e$ can be synchronized with namespace $203_b$ ("namespace2") even though collection $210_b$ is synchronized with namespace $203_a$ ("namespace1"). In some such embodiments, collections (e.g., collection 210 and content items (e.g., content item 2120 contained within child collection (e.g., collection $210_e$) are synchronized with namespace associated with child collection (e.g., namespace $203_b$). For example, content item $212_b$ is synchronized with 212; and collection $210_f$ is synchronized with $210_n$.

Namespace 203 can refer to a physical drive (e.g., solid state drive, hard disk drive, compact disk drive, flash memory, storage array, etc.), an account, a directory, a network resource (e.g., network attached storage, cloud resource, IP address, web page, etc.), etc. Namespace 203 can refer to a portion of physical, an account, a directory, a network resource, etc. In some embodiments, client device 102 "mounts" namespace 203, thus confining certain operations conducted by client device 102 to the content's namespace 203. Because different namespaces 203 might be located in distinct locations, it can be beneficial to isolate operations to one namespace at a time to prevent random accesses to diverse resources. For example, client device $102_a$ can mount namespace $203_a$ ("namespace1") and conduct synchronization operations with that namespace, it can then unmount namespace $203_a$ and mount $203_b$ ("namespace2") for the remainder of the operations. Alternatively, client device $102_a$ can simultaneously mount namespace $203_a$ and namespace $203_b$. A namespace can be associated with one or more users of content management system 106. If namespace 203 is associated, or capable of being associated, with multiple users or user accounts, it can be considered a shared namespace 203.

Distinct namespace synchronization can assist in sharing scenarios. For example, collection $210_e$ on client device $102_a$ can be synchronized with namespace $203_b$ which can also be synchronized with collection $210_j$ on client device $102_b$, perhaps as a result of a sharing instruction. In some embodiments, all child collections (e.g., collection $210_i$) and child content items 212 (e.g., content item $212_e$) are synchronized with the parent collection's (e.g., collection $210_h$) namespace (e.g., namespace $203_c$). However, when the child collection (e.g., collection 2100 or child content item (e.g., content item $212_d$) is shared, it is no longer synchronized with the original namespace (e.g., namespace $203_c$). A new namespace (e.g., namespace $203_b$) can then be created for synchronizing the shared content item or shared collection (e.g., synchronizing collection $210_j$) and its descendants. After establishing distinct namespaces (e.g., namespace $203_b$ and namespace $203_c$), a device (e.g., client device $102_b$) can move, rename, or otherwise modify a collection (e.g., collection $210_j$) that is associated with a namespace (e.g., namespace $203_b$) and preserve synchronization and sharing attributes. For example, collection $210_e$ and collection $210_j$ are synchronized (by way of namespace $203_b$) although they have different labels ("Share" and "Vacay", respectively). As long as namespace translator 202 is informed about move or rename operations, collection $210_e$ and collection $210_j$ can maintain their association with namespace $203_b$.

As depicted in FIG. 2, collection 210 (e.g., collection $210_h$) can be associated with one namespace (e.g., namespace $203_c$) while a child collection (e.g., collection 210) can be associated with another namespace (e.g., namespace $203_b$). Although not pictured, descendants of child collections can be associated with still another namespace; for example, collection $210_k$ can be associated with a namespace3 (not pictured).

An example scenario highlighting some of these features is as follows. A user on client device $102_a$ might create collection $210_e$ within synchronized collection $210_b$. Collection $210_e$ can then synchronize with namespace $203_a$. The user can then share collection $210_e$ with a second user. Collection $210_e$ can then be disassociated with namespace $203_a$ and associated with namespace $203_b$. Namespace $203_b$ can be a new namespace 203 and can result in content item $212_i$ and collection $210_n$ being moved from namespace $203_a$ to namespace $203_b$. Synchronization software on client device $102_b$ can then synchronize namespace $203_b$ with collection $210_i$ creating collection $210_j$ if needed. The second user now has the flexibility to move, rename, or otherwise modify collection $210_j$ while preserving synchronization and sharing attributes. For example, collection $210_e$ is labelled "Share" on client device $102_a$ but the equivalent collection $210_j$ on client device $102_b$ is labelled "Vacay." This implementation permits users to organize their collections 210 without worrying about interfering with synchronization or sharing logic.

The location of an item (e.g., collection 210 or content item 212) can be expressed as a path. For example, if collection $210_h$ is located in the "root" on client device $102_b$, the path of content item $212_d$ can be represented as "root:// Impt/Pics/Vacay/pic." On content management system 106, namespace 203 can be similar to a root collection. For example, the path of content item $212_i$ can be represented as "namespace2:pic."

In some embodiments, namespace translator 202 can receive a path from client device 102 and translate it to an appropriate path for content management system 106. The path that namespace translator 202 receives can take many forms; for example, it can receive a client device path (e.g., "root://Impt/Pics/Vacay/pic" for content item 212$_d$), a parent namespace path (e.g., "namespace3:Pics/Vacay/Pic"), a namespace relative path (e.g., "/Pics/Vacay/Pic"), a relative path, or any other indication of an item's location (e.g., "parent collection: Vacay"). Namespace translator 202 can receive the path by itself or as part of a synchronization operation (e.g., a request to synchronize an item).

Namespace translator 202 can then identify a known path prefix (e.g., "root://Impt/Pics/Vacay/", "namespace3:Pics/Vacay/", etc.) in the received path and translate it to the correct namespace 203 (e.g., "namespace2:") to form a correct path (e.g., "namespace2:pic"). In some embodiments, namespace translator 202 deletes the known path prefix and then prepends the correct namespace 203 to the path. In some embodiments, the received path and the correct path are different forms or styles (e.g., one might be a Unix path and the other might be an MS-DOS/Microsoft Windows path). In such embodiments, namespace translator 202 can also translate the style of namespace 203. Namespace translator 202 can then send the correct path to content management system 106. In embodiments where client device 102 sent a synchronization request which included the received path to namespace translator 202, namespace translator 202 can forward the synchronization request to content management system 106 with the correct path.

Namespace translator 202 can be a component within content management system 106, a component attached to content management system 106, or an independent component of a system. Because namespace translator 202 can be a component within content management system 106, it should be understood that in such embodiments when it sends a corrected path or forwards a synchronization request to content management system 106, it can send the path or request to another component of content management system 106.

Although synchronization operations are discussed herein, it should be understood that other collection 210 and content item 212 operations can benefit from these principles. The principles disclosed herein can benefit other operations dealing with resources that are not collections 210 or content items 212 (e.g., computers, web pages, printers, or other devices).

FIGS. 3A-3F show various example namespace mount tables 300$_a$-300$_d$ (collectively, namespace mount table 300). Namespace mount table 300 can include entries 302$_a$-302$_l$ (collectively, entry 302) which contain a mounted namespace 203 (e.g., correct prefix) and its associated client path (e.g., received path prefix). Namespace mount table 300$_a$ and 300$_b$ can be associated with client device 102$_a$. Namespace mount table 300$_c$ can be associated with client device 102$_b$. Namespace mount table 300$_d$ can be associated with a client device 102 not otherwise depicted. In some embodiments, there is a namespace mount table 300 for each client device 102. The relationship between mounted namespace 203 and client path can be bidirectional. E.g., in entry 302 "namespace2:" can translate to "namespace1:/Share/" while "namespace1:Share/" can translate to "namespace2:".

In some embodiments, namespace mount table 300 does not include a path, but rather it can include an identifier or identifiers for content items 212 or collections 210. For example, a list of hashes for content items 212 associated with the namespace 203.

In some embodiments, entries 302 are ordered within namespace mount table 300. For example, in namespace mount table 300$_d$ entries 302$_g$-302$_l$ can be analyzed in order. When namespace translator 202 receives a client path, it can first determine if a portion of the received path matches entry 302$_g$, if not it can determine if a portion of received path matches entry 302$_h$, and so on until it finds a match. The order can be according to an inverted tree; the leaf nodes (e.g., entries 302 containing a path pointing to descendent items) can be listed first while the root nodes (e.g., entries 302 containing a path pointing to root items) can be listed last.

Namespace mount table 300 can be stored as various data structures. If namespace mount table 300 is a tree, namespace translator 202 can traverse the tree until it finds a node/entry that matches a portion of the client path but does not have any child nodes that match a portion of the client path. It can then apply the translation prescribed by the found entry.

FIG. 3E shows an example client synchronization program mount table 310. Client device 102 can use client synchronization program mount table to maintain a list of currently mounted namespaces 203 in the system. For example, row 312 indicates that "namespace1" is mounted at "C:/Cloud/" (e.g., collection 210$_b$). Multiple namespaces 203 can be mounted at once, for example, in row 313 "namespace2" can also be mounted at local path "C:/Cloud/Share/" (e.g., collection 210$_e$). In some embodiments, as depicted, a mounted namespace 203 (e.g., "namespace2") can be mounted within another namespace 203 (e.g., "namespace 1").

FIG. 3F shows how various paths that refer to the same collection 210 can be reported by various entities. For example, in row 330 a path of "C:/Temp/" might be reported by the operating system but not by a client synchronization program running on client device or content management system 106. This might be because "C:/Temp/" is not associated with any synchronized namespaces 203. In row 332, a path of "C:/Cloud/Work/file" (e.g., content item 212$_a$) can be reported by the operating system. When making synchronization requests, the client synchronization program can report the path as "namespace1: Work/file". The content management system can report the same path as "namespace1: Work/file" (e.g., content item 212$_g$). In row 334, a path of "C:/Cloud/Share/pic" (e.g., content item 212$_b$) can be reported by the operating system. When making synchronization requests, the client synchronization program can report the path as "namespace1: Share/pic". The content management system can report the same path as "namespace2: pic" (e.g., content item 212$_i$).

Figure 4:
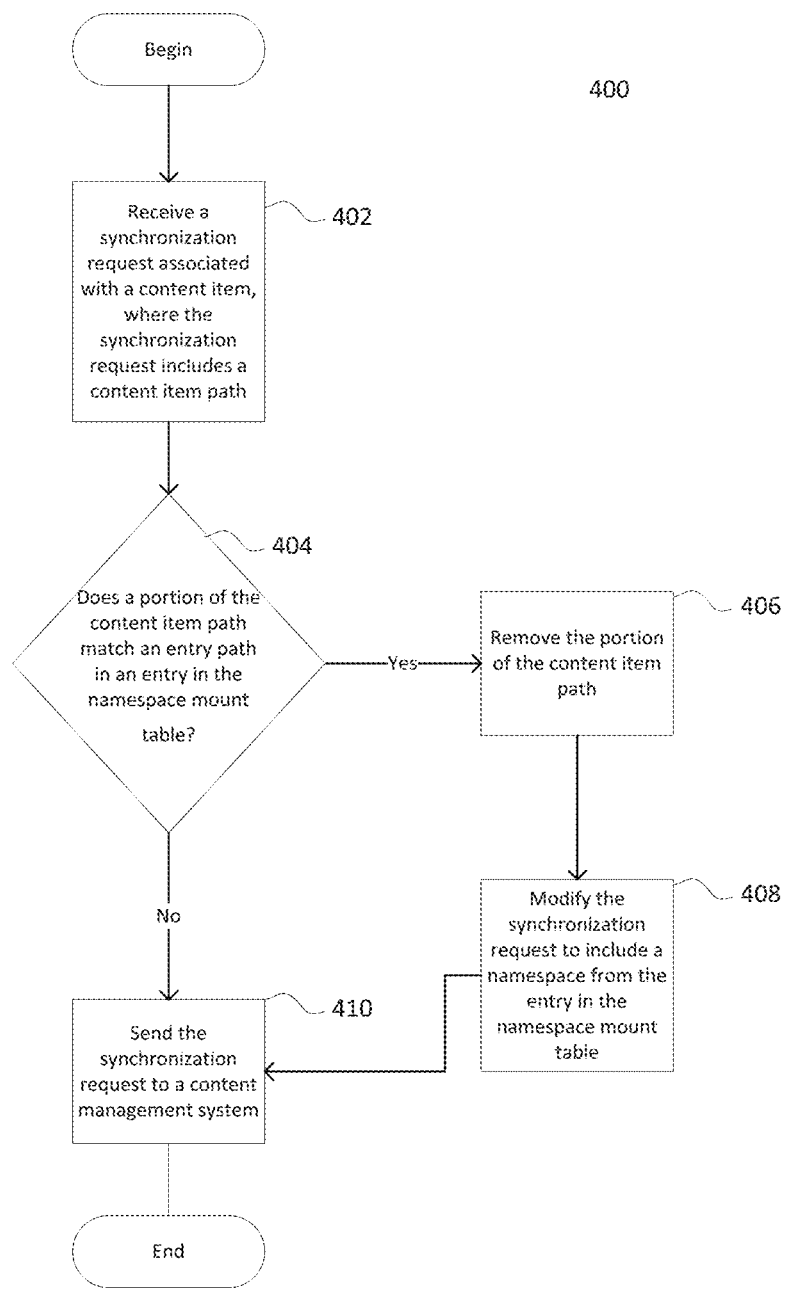
FIG. 4 shows an example flowchart for translating namespaces in accordance with some embodiments.

FIG. 4 shows an example flowchart 400 according to some embodiments. Example flowchart 400 can be used for translating a client synchronization request into the appropriate namespace 203 for content management system 106. First, namespace translator 202 can receive a synchronization request associated with a content item where the synchronization request includes a content item path (402). Next, namespace translator 202 can determine if a portion of the content item path matches an entry path in an entry in the namespace mount table (404). As explained earlier, this would mean that if content item path is "root://a/b/namespace/d/item.ext" and an entry exists with the path of "root://a/b/namespace/" then a portion of the content item path would match the entry path. If there is a match, namespace translator 202 can remove the portion of the content item path (406). In the prior example, this would mean that "root://a/b/namespace/" would be removed, resulting in "d/item.ext". In some embodiments, instead or in addition to removing the portion of the content item path, namespace translator 202 can modify the synchronization request to indicate the new path. Namespace translator 202 can next modify the synchronization request to include a namespace from the entry in the namespace mount table (408). In some embodiments, this includes changing a "namespace" field in the synchronization request. In some embodiments, namespace translator 202 maintains a connection with content management system 106 for each namespace 203 and when namespace translator 202 sends a synchronization request using a particular connection, the request will be directed to the namespace 203 associated with that connection. In some such embodiments, step 408 includes sending the synchronization request over the connection associated with the namespace 203 from the entry in the namespace mount table 300. Namespace translator 202 can then send the synchronization request to a content management system (410).

Figure 5:
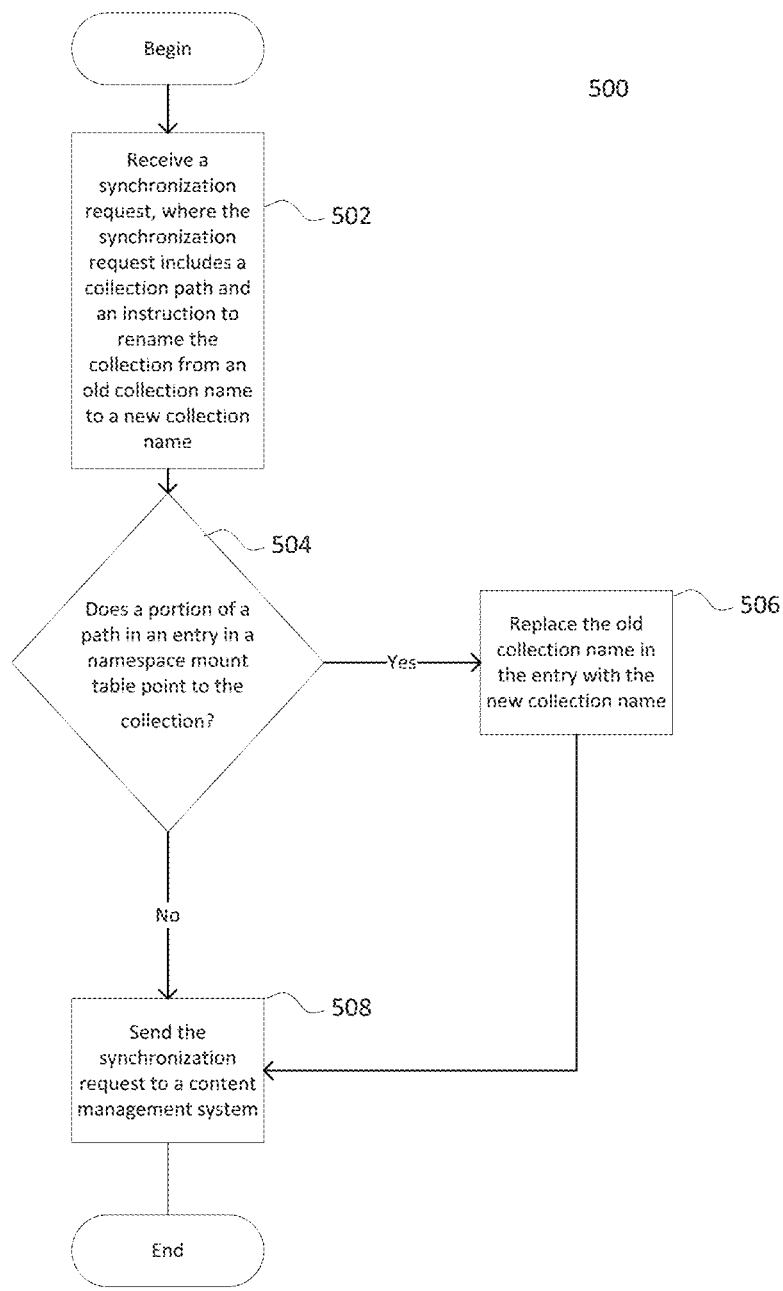
FIG. 5 shows an example flowchart for translating namespaces in accordance with some embodiments.

FIG. 5 shows a synchronization request dealing with collection 210, specifically for renaming collection 210. Because renaming and moving collection 210 might influence namespace mount table 300, it is important to identify such synchronization requests. In example flowchart 500, namespace translator 202 can receive a synchronization request, where the synchronization request includes a collection path and an instruction to rename the collection from an old collection name to a new collection name (502). Namespace translator 202 can then determine if a portion of a path in an entry in a namespace mount table points to the collection (504). This would mean that if the collection path is "root://a/b/", the old name is "c", the new name is "x", and the namespace mount table 300 has an entry with the path of "root://a/b/namespace/d/" then the entry should be renamed to be "root://a/b/x/d/". In embodiments where shared folders are managed with separate namespaces 203, these steps can be useful when the parent of a shared folder is renamed. If a "yes" outcome is determined at 504, namespace translator 202 can replace the old collection name in the entry with the new collection name (506). Namespace translator 202 can then send the synchronization request to a content management system (508). The content management system 106 in step 508 can be the content management system 106 for which the request was originally intended.

Figure 6:
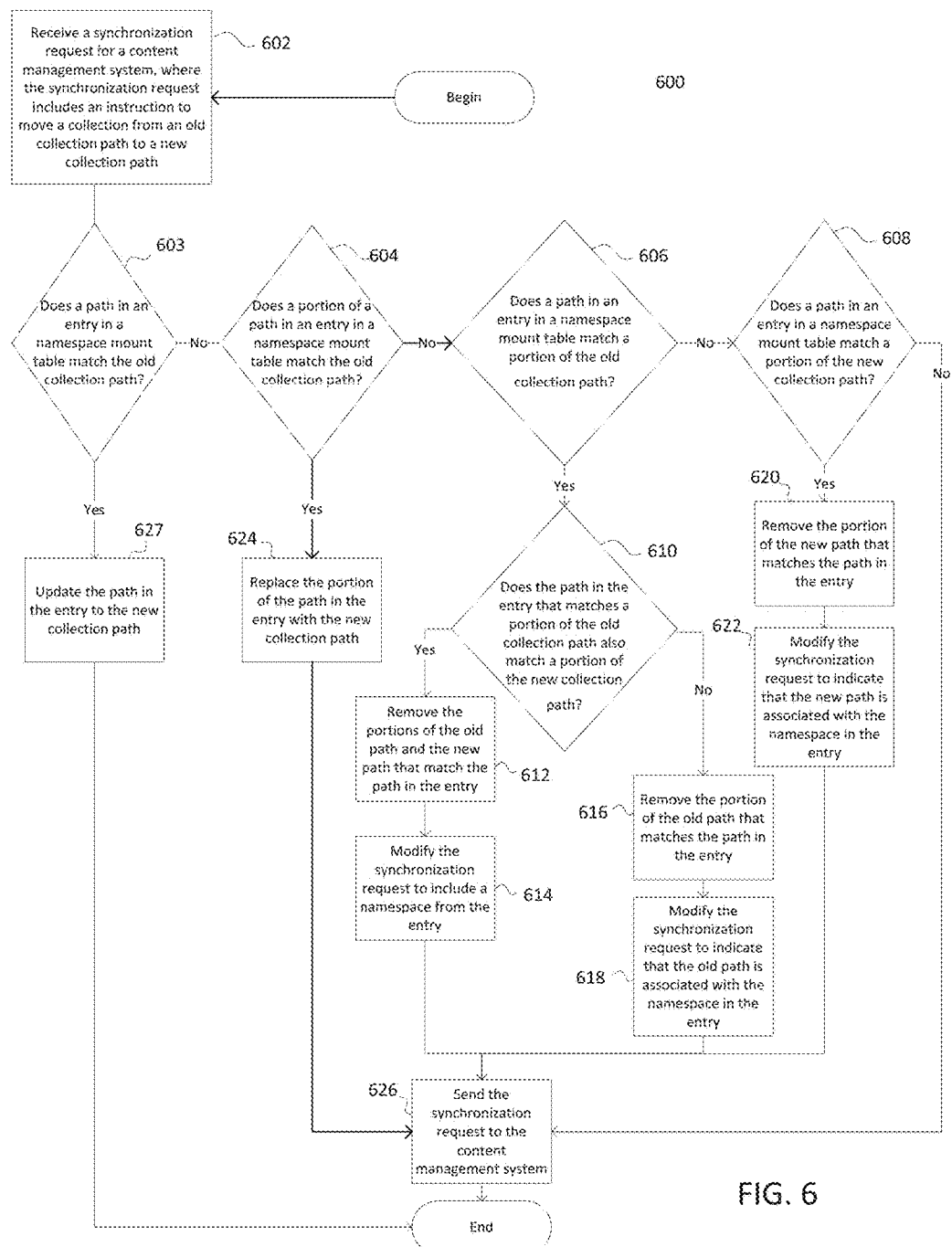
FIG. 6 shows an example flowchart for translating namespaces in accordance with some embodiments.

FIG. 6 shows an example flowchart 600 according to some embodiments where a synchronization request includes a request to move a collection. Namespace translator 202 can receive a synchronization request for a content management system, where the synchronization request includes an instruction to move a collection from an old collection path to a new collection path (602). The path in an entry of namespace mount table 300 can be called the namespace path (e.g., "root://a/b/namespace"); the path that includes the namespace path can be called a child path (e.g., "root://a/b/namespace/d/"); a path that the namespace path includes can be called a parent path (e.g., "root://a/b/"); and a path that neither completely includes or is completed included by the namespace path can be called an unrelated path (e.g., "root://a/b/m/"). Within the context of these definitions, flowchart 600 outlines various scenarios of how collections might be relocated between the parent, namespace, child, and unrelated paths. The following steps pertain to dealing with these various scenarios (steps 603, 604, 606, 608, and 610). It should be understood that these steps can be performed in different orders (e.g., step 606 before step 603) and some steps can be omitted altogether.

Namespace translator 202 can determine if a path in an entry in a namespace mount table matches the old collection path (603). This step can determine whether the old path points to the namespace path, which would mean the old path translates to a namespace 203. For example, if the old namespace path is "root://a/b/namespace" and the namespace path is "root://a/b/namespace" then there would be a match. Because this translation, in some embodiments, is done entirely within namespace translator 202, content management system 106 can be unaware of which path points to which namespace 203 within namespace mount table 300. Therefore, if there's a match at 603, namespace translator 202 can update the path in the entry to the new collection path (627). For example, namespace translator 202 can update namespace mount table 300. In some embodiments, this "move" does not affect the data contained in content management system 106 and the flowchart is complete without requiring communication with content management system 106.

If there is not a match at 603, namespace translator 202 can determine if a portion of a path in an entry in a namespace mount table matches the old collection path (604). This step can determine whether the old path is a parent path to a namespace path. For example, if the old path is "root://a/" it would match a namespace path of "root://a/b/namespace". Namespace translator 202 can then update namespace mount table 300 and then send the synchronization request to content management system 106. Namespace translator 202 can replace the portion of the path in the entry (e.g., that matched) with the new collection path (624). For example, if the old path is "root://a/", the new path is "root2://x/y/z/", and the namespace path is "root://a/b/namespace" then the resultant path in the entry would be "root2://x/y/z/b/c". Namespace translator 202 can then send the synchronization request to the content management system (626). In some embodiments, namespace translator 202 can also send part of the original synchronization request to content management system 106.

If there is not a match at 604, namespace translator 202 can determine if a path in an entry in a namespace mount table matches a portion of the old collection path (606). This step can determine whether the old path is a child path to the namespace path. For example, if old path is "root://a/b/namespace/d" it would match a namespace path of "root://a/b/namespace". Namespace translator 202 can then determine if the path in the entry that matches a portion of the old collection path also matches a portion of the new collection path (610). This step determines whether the collection needs to be moved from one namespace 203 to another. If yes, namespace translator 202 can remove the portions of the old path (e.g., old collection path) and the new path (e.g., new collection path) that match the path in the entry (612). Namespace translator 202 can then modify the synchronization request to include a namespace from the entry (614). If step 610 does not result in a match, namespace translator 202 can remove the portion of the old path that matches the path in the entry (616). Namespace translator 202 can then modify the synchronization request to indicate that the old path is associated with the namespace in the entry (618). This would result in an inter-namespace move from the namespace 203 in the entry to another namespace 203 (e.g., the namespace 203 in the request or another namespace 203). In some embodiments, the flowchart then progresses to step 626, as described above.

If there is not a match at 606, namespace translator 202 can determine if a path in an entry in a namespace mount table matches a portion of the new collection path (608).

Because of previous steps 603, 604, and 606, it can be assumed that the old collection path is an unrelated path (e.g., "root://a/b/m/") and this step determines if the new collection path is a child path (e.g., "root://a/b/namespace/d"). If it is a child path, namespace translator 202 can remove the portion of the new path that matches the path in the entry (620) and modify the synchronization request to indicate that the new path is associated with the namespace in the entry (622). In some embodiments, the synchronization request can be changed to be a namespace transfer or similar where the collection and its associated child collections and content items are removed from one namespace 203 and added to another namespace 203. The flowchart can then progress to step 626, as described above.

It should be understood that flowchart 600 can be used to determine how to modify content item paths as well as collection paths. For example, step 602 can include " . . . where the synchronization request includes an instruction to move a content item from an old content item path to a new content item path". Other steps in flowchart 600 can be adjusted accordingly.

Figure 7:
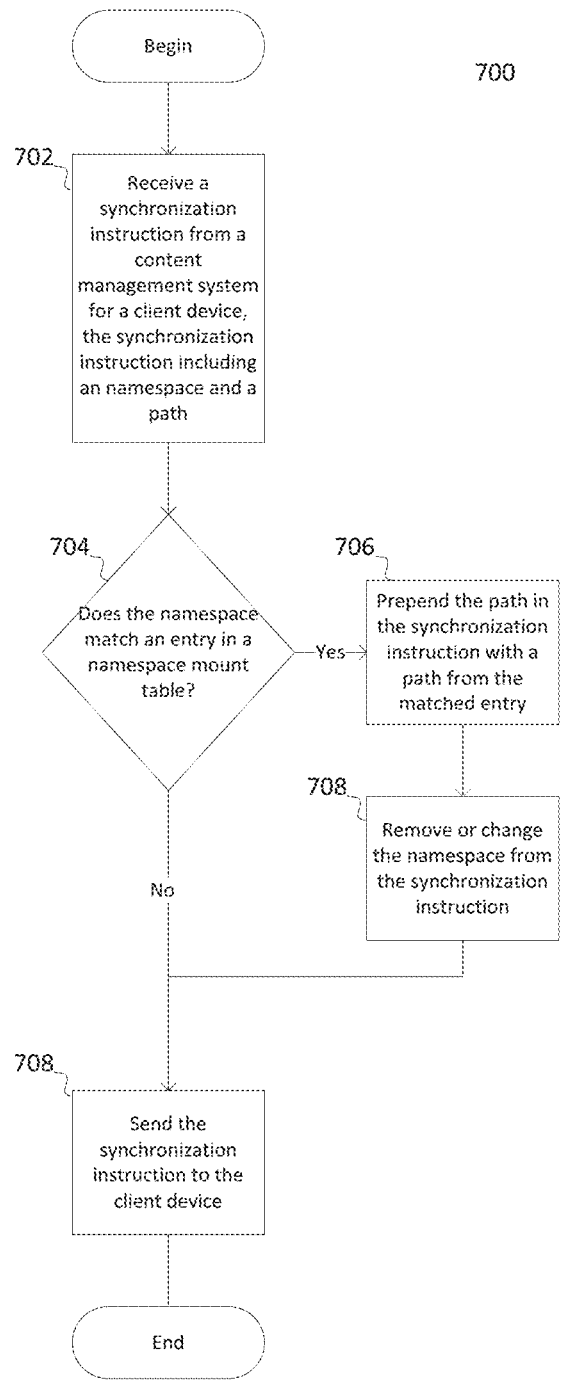
FIG. 7 shows an example flowchart for translating namespaces in accordance with some embodiments.

Although flowcharts 400, 500, and 600 contemplate a single namespace 203 or a pair of namespaces 203, it should be understood that operations may involve translating between any number of namespaces 203. For example, a synchronization request from client device 102 may include a first namespace, and namespace translator 202 can translate each path (e.g., "old collection path" and "new collection path") to a first and second namespace according to the principles herein disclosed. It should also be understood that the principles herein disclosed can be applied to situations where the synchronization request comes from content management system 106 and is translated for use on one or more client devices 102. For example, in FIG. 7, flowchart 700 shows namespace translator 202 receiving a synchronization request from content management system 106. Namespace translator 202 can receive a synchronization instruction (e.g., request) from a content management system for a client device, the synchronization instruction including a namespace and a path (702). In some embodiments, the synchronization instruction includes more than one namespace 203 and more than one path (e.g., for a move operation). Namespace translator 202 can then determine if the namespace matches an entry in a namespace mount table (704). If so, namespace translator 202 can prepend the path in the synchronization instruction with a path from the matched entry (706). For example, if the path were "d/e/f/" and the path in the entry is "root://a/b/namespace/" the resultant path could be "root://a/b/namespace/d/e/f/". Namespace translator 202 can then remove or change the namespace from the synchronization instruction (708). In some embodiments, client device 102 does not use namespaces 203; in such embodiments, namespace translator 202 can omit namespace 203 from the synchronization instruction. In embodiments where client device uses namespaces 203, namespace translator 202 can modify the synchronization instruction accordingly. If there are multiple namespaces 203, steps 704-708 can be repeated for each namespace 203. Namespace translator 202 can then send the synchronization instruction to the client device 708.

Figure 8A:
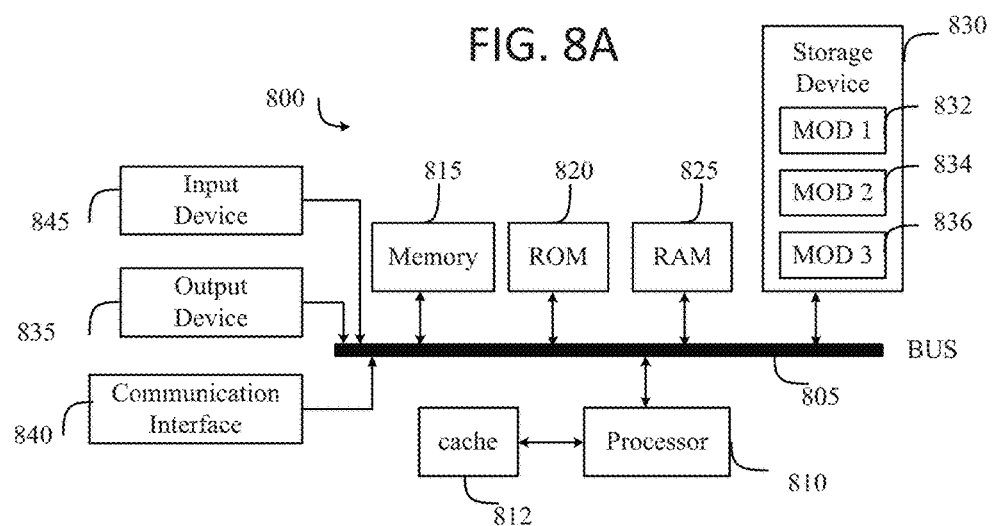
FIG. 8A shows an example possible system embodiment for implementing various embodiments of the present technology.
Figure 8B:
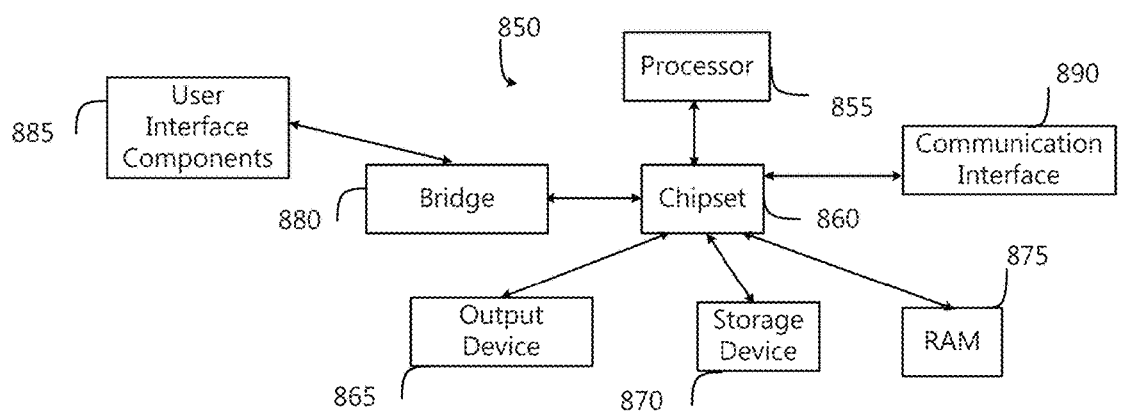
FIG. 8B shows an example possible system embodiment for implementing various embodiments of the present technology.

8A and FIG. 8B show example possible system embodiments. The more appropriate embodiment will be apparent to those of ordinary skill in the art when practicing the present technology. Persons of ordinary skill in the art will also readily appreciate that other system embodiments are possible.

FIG. 8A illustrates a conventional system bus computing system architecture 800 wherein the components of the system are in electrical communication with each other using a bus 805. Example system 800 includes a processing unit (CPU or processor) 810 and a system bus 805 that couples various system components including the system memory 815, such as read only memory (ROM) 820 and random access memory (RAM) 825, to the processor 810. The system 800 can include a cache of high-speed memory connected directly with, in close proximity to, or integrated as part of the processor 810. The system 800 can copy data from the memory 815 and/or the storage device 830 to the cache 812 for quick access by the processor 810. In this way, the cache can provide a performance boost that avoids processor 810 delays while waiting for data. These and other modules can control or be configured to control the processor 810 to perform various actions. Other system memory 815 may be available for use as well. The memory 815 can include multiple different types of memory with different performance characteristics. The processor 810 can include any general purpose processor and a hardware module or software module, such as module 1 832, module 2 834, and module 3 836 stored in storage device 830, configured to control the processor 810 as well as a special-purpose processor where software instructions are incorporated into the actual processor design. The processor 810 may essentially be a completely self-contained computing system, containing multiple cores or processors, a bus, memory controller, cache, etc. A multi-core processor may be symmetric or asymmetric.

To enable user interaction with the computing device 800, an input device 845 can represent any number of input mechanisms, such as a microphone for speech, a touch-sensitive screen for gesture or graphical input, keyboard, mouse, motion input, speech and so forth. An output device 835 can also be one or more of a number of output mechanisms known to those of skill in the art. In some instances, multimodal systems can enable a user to provide multiple types of input to communicate with the computing device 800. The communications interface 840 can generally govern and manage the user input and system output. There is no restriction on operating on any particular hardware arrangement and therefore the basic features here may easily be substituted for improved hardware or firmware arrangements as they are developed.

Storage device 830 is a non-volatile memory and can be a hard disk or other types of computer-readable media which can store data that are accessible by a computer, such as magnetic cassettes, flash memory cards, solid state memory devices, digital versatile disks, cartridges, random access memories (RAMs) 825, read only memory (ROM) 820, and hybrids thereof.

The storage device 830 can include software modules 832, 834, 836 for controlling the processor 810. Other hardware or software modules are contemplated. The storage device 830 can be connected to the system bus 805. In one aspect, a hardware module that performs a particular function can include the software component stored in a computer-readable medium in connection with the necessary hardware components, such as the processor 810, bus 805, display 835, and so forth, to carry out the function.

FIG. 8B illustrates a computer system 850 having a chipset architecture that can be used in executing the described method and generating and displaying a graphical user interface (GUI). Computer system 850 is an example of computer hardware, software, and firmware that can be used to implement the disclosed technology. System 850 can include a processor 855, representative of any number of physically and/or logically distinct resources capable of executing software, firmware, and hardware configured to perform identified computations. Processor 855 can communicate with a chipset 860 that can control input to and output from processor 855. In this example, chipset 860 outputs information to output 865, such as a display, and can read and write information to storage device 870, which can include magnetic media, and solid state media, for example. Chipset 860 can also read data from and write data to RAM 875. A bridge 880 for interfacing with a variety of user interface components 885 can be provided for interfacing with chipset 860. Such user interface components 885 can include a keyboard, a microphone, touch detection and processing circuitry, a pointing device, such as a mouse, and so on. In general, inputs to system 850 can come from any of a variety of sources, machine generated and/or human generated.

Chipset 860 can also interface with one or more communication interfaces 890 that can have different physical interfaces. Such communication interfaces can include interfaces for wired and wireless local area networks, for broadband wireless networks, as well as personal area networks. Some applications of the methods for generating, displaying, and using the GUI disclosed herein can include receiving ordered datasets over the physical interface or be generated by the machine itself by processor 855 analyzing data stored in storage 870 or 875. Further, the machine can receive inputs from a user via user interface components 885 and execute appropriate functions, such as browsing functions by interpreting these inputs using processor 855.

It can be appreciated that example systems 800 and 850 can have more than one processor 810 or be part of a group or cluster of computing devices networked together to provide greater processing capability.

For clarity of explanation, in some instances the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software modules, alone or in combination with other devices. In an embodiment, a software module can be software that resides in memory of a client device and/or one or more servers of a content management system and perform one or more functions when a processor executes the software associated with the module. The memory can be a non-transitory computer-readable medium.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer-readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

What is claimed is:

1. A computer implemented method comprising:
   receiving, from one or more client devices, a first synchronization request associated with a first content item, wherein the first synchronization request includes a first content item path;
   determining that a portion of the first content item path matches an entry path in an entry in a namespace mount table, wherein the entry includes a namespace;
   modifying the first synchronization request to:
      remove the portion of the first content item path; and
      include the namespace;
   sending the first synchronization request to a content management system;
   receiving, from the content management system, a second synchronization request including a first instruction to unmount the namespace; and
   sending, to the one or more client devices, a second instruction to recursively delete a collection described by the entry path.

2. The computer-implemented method of claim 1, wherein the first synchronization request includes a second namespace, the method further comprising removing the second namespace from the first synchronization request.

3. The computer-implemented method of claim 1, further comprising:
   prior to receiving the second synchronization request, receiving a third synchronization request from the one or more client devices, wherein the third synchronization request includes a third instruction to rename the collection, the third instruction including a new collection name and an old collection name;
determining that a portion of the entry path points to the collection, the entry path including the old collection name;
replacing the old collection name in the entry path with the new collection name; and
sending the third synchronization request to the content management system.

4. The computer-implemented method of claim 1, further comprising:
prior to receiving the second synchronization request, receiving a third synchronization request from the one or more client devices, wherein the third synchronization request includes a third instruction to move the collection, the third instruction including a new collection path and an old collection path;
determining that a portion of the entry path matches the old collection path;
replacing the portion of the entry path with the new collection path; and
sending the third synchronization request to the content management system.

5. The computer-implemented method of claim 1, further comprising:
receiving a third synchronization request from the one or more client devices, wherein the third synchronization request includes a third instruction to move a second collection, the instruction including a new collection path and an old collection path;
determining that a second entry path in a second entry in the namespace mount table matches a portion of the old collection path;
determining that the second entry path does not match a portion of the new collection path;
in response to determining that the second entry path matches a portion of the old collection path and does not match a portion of the new collection path:
removing the portion of the old collection path; and
modifying the third synchronization request to indicate that the old collection path is associated with a second namespace in the second entry; and
sending the third synchronization request to the content management system.

6. The computer-implemented method of claim 1, further comprising:
receiving a third synchronization request from the content management system, wherein the third synchronization request includes an instruction to remount the namespace; and
sending a third instruction to the one or more client devices to add the collection described by the entry path.

7. The computer-implemented method of claim 1, further comprising:
receiving, from the content management system, a third synchronization request associated with a second content item, wherein the third synchronization request includes a second namespace and a second path, wherein the second path describes a location of the second content item within the second namespace;
determining that the second namespace is described in the entry;
modifying the second synchronization request to:
prepend the entry path to the second path; and
remove the second namespace; and
sending the third synchronization request to the one or more client devices.

8. A non-transitory computer-readable medium storing computer executable instructions that, when executed by one or more processors, cause the one or more processors to:
receive, from one or more client devices, a first synchronization request associated with a first content item, wherein the first synchronization request includes a first content item path;
determine that a portion of the first content item path matches an entry path in an entry in a namespace mount table, wherein the entry includes a namespace;
modify the first synchronization request to:
remove the portion of the first content item path; and
include the namespace;
receive a second synchronization request from the one or more client devices, wherein the second synchronization request includes an instruction to move a collection, the instruction including a new collection path and an old collection path;
determine that a portion of the entry path matches the old collection path;
replacing the portion of the entry path that matches the old collection path with the new collection path; and
send the first synchronization request and the second synchronization request to a content management system.

9. The non-transitory computer-readable medium of claim 8, wherein the first synchronization request includes a second namespace, wherein the computer executable instructions further cause the one or more processors to remove the second namespace from the first synchronization request.

10. The non-transitory computer-readable medium of claim 8, wherein the instruction to move the collection comprises an instruction to rename the collection from an old collection name to a new collection name, wherein the old collection name is associated with the old collection path and the new collection name is associated with the new collection path.

11. The non-transitory computer-readable medium of claim 10, wherein the entry path includes the old collection name, wherein replacing the portion of the entry path that matches the old collection path with the new collection path comprises replacing the old collection name in the entry path with the new collection name.

12. The non-transitory computer-readable medium of claim 8, wherein the computer executable instructions further cause the computer to:
receive a third synchronization request from the one or more client devices, wherein the third synchronization request includes a second an instruction to move a second collection, the second instruction including a respective new collection path and a respective old collection path;
determine that a respective entry path in a respective entry in the namespace mount table matches a portion of the respective old collection path;
determine that the respective entry path does not match a portion of the respective new collection path;
in response to determining that the respective entry path matches a portion of the respective old collection path and does not match a portion of the respective new collection path:
remove the portion of the respective old collection path; and modify the third synchronization request to indicate that the respective old collection path is associated with a second namespace in the respective entry; and send the third synchronization request to the content management system.

13. The non-transitory computer-readable medium of claim 8, wherein the computer executable instructions further cause the one or more processors to:

receive a third synchronization request from the content management system, wherein the third synchronization request includes a second instruction to unmount the namespace; and send a third instruction to the one or more client devices to recursively delete a second collection described by the entry path.

14. The non-transitory computer-readable medium of claim 8, wherein the computer executable instructions further cause the one or more processors to:

receive, from the content management system, a third synchronization request associated with a second content item, wherein the third synchronization request includes the namespace and a second path, wherein the second path describes the location of the second content item within the namespace;

determine that the namespace is described in the entry:

modify the third synchronization request to: prepend the entry path to the second path; and remove the namespace; and send the third synchronization request to the one or more client devices.

15. A system comprising:

one or more processors; and at least one computer-readable medium; and computer-readable instructions stored on the at least one computer-readable medium, that when executed by the one or more processors cause the system to:

receive, from one or more client devices, a first synchronization request associated with a first content item, wherein the first synchronization request includes a first content item path;

determine that a portion of the first content item path matches an entry path in an entry in a namespace mount table, wherein the entry includes a namespace;

modify the first synchronization request to:

remove the portion of the first content item path; and include the namespace;

send the first synchronization request to a content management system;

receive, from the content management system, a second synchronization request including a first instruction to unmount the namespace; and send, to the one or more client devices, a second instruction to recursively delete a collection described by the entry path.

16. The system of claim 15, wherein the first synchronization request includes a second namespace, the system further comprising non-transitory computer-readable instructions stored on the computer-readable medium that, when executed by the one or more processors, cause the system to remove the second namespace from the first synchronization request.

17. The system of claim 15, further comprising non-transitory computer-readable instructions stored on the computer-readable medium that, when executed by the one or more processors, cause the system to:

receive a third synchronization request from the one or more client devices, wherein the third synchronization request includes a third instruction to rename a collection, the instruction including a new collection name and an old collection name;

determine that a portion of the entry path points to the collection, the entry path including the old collection name;

replace the old collection name in the entry path with the new collection name; and send the third synchronization request to the content management system.

18. The system of claim 15, further comprising non-transitory computer-readable instructions stored on the computer-readable medium that, when executed by the one or more processors, cause the system to:

receive a third synchronization request from the one or more client devices, wherein the third synchronization request includes a third instruction to move a collection, the third instruction including a new collection path and an old collection path;

determine that a portion of the entry path matches the old collection path;

replace the portion of the entry path with the new collection path; and send the third synchronization request to the content management system.

19. The system of claim 15, further comprising non-transitory computer-readable instructions stored on the computer-readable medium that, when executed by the one or more processors, cause the system to:

receive a third synchronization request from the one or more client devices, wherein the third synchronization request includes a third instruction to move the collection, the third instruction including a new collection path and an old collection path;

determine that a second entry path in a second entry in the namespace mount table matches a portion of the old collection path;

determine that the second entry path does not match a portion of the new collection path;

in response to determining that the second entry path matches a portion of the old collection path and does not match a portion of the new collection path:

remove the portion of the old collection path; and modify the third synchronization request to indicate that the old collection path is associated with a second namespace associated with the second entry; and send the third synchronization request to the content management system.

20. The system of claim 15, further comprising non-transitory computer-readable instructions stored on the computer-readable medium that, when executed by the one or more processors, cause the system to:

receive, from the content management system, a third synchronization request associated with a second content item, wherein the third synchronization request includes a second namespace and a second path, wherein the second path describes a location of the second content item within the second namespace;

determine that the second namespace is described in the entry;

modify the third synchronization request to:

prepend the entry path to the second path; and remove the second namespace; and send the third synchronization request to the one or more client devices.

\* \* \* \* \*